Figure 1:
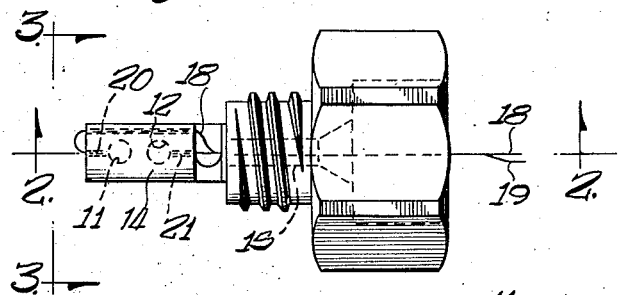

July 2, 1957  L. B. SAND  2,797,575
DIFFERENTIAL TEMPERATURE AUTOCLAVE
Filed Dec. 29, 1955

Inventor
Leonard B. Sand
By Everett A. Johnson
Attorney

United States Patent Office 2,797,575
Patented July 2, 1957

2,797,575
DIFFERENTIAL TEMPERATURE AUTOCLAVE

Leonard B. Sand, Salt Lake City, Utah, assignor to Standard Oil Company, Chicago, Ill., a corporation of Indiana Application December 29, 1955, Serial No. 556,134

3 Claims. (Cl. 73—15)

This invention relates to a device for obtaining differential thermals under high pressures of liquids and gases.

Devices of this type are useful in studying phase changes during the setting of cements and concretes and in evaluating changes in hydration under high pressures of various atmospheres. They are useful for recording dehydration phenomena and phase transfomations both in research and in routine testing of commercial cements, concretes and related materials.

It is a primary object of this invention to provide an autoclave adapted to obtain thermal data under high pressures of liquids and/or gases. It is a further object of the invention to provide an apparatus for evaluating the performance of cements, clays, and concretes, the stability of clay-organic complexes, and characteristics of other materials, all under elevated pressures and temperatures.

It is desirable that autoclaves of the type to which this invention pertains should have substantially linear heating rates, have minimum convection currents, and be adapted for use on small and unconsolidated samples. Accordingly, it is an additional object to provide an apparatus of small heat capacity and small internal volume. Further, it is an object to provide an apparatus which can be kept in a level position during assembly and while being introduced into a furnace. These and other objects of the invention will become apparent as my description thereof proceeds.

Briefly, I attain the objects of my invention by providing a metal sample block containing two blind cavities, one to contain the crushed sample under study and the other a reference material of similar heat capacity and thermally inert. Differential thermocouple means are associated with the two cavities and the sample block is designed as an integral component of one end of an autoclave assembly. The sample block can be loaded and the two components of the autoclave assembled without changing position of the sample block. Further, the resultant autoclave assembly can be maintained level during introduction into a horizontal muffle furnace.

The autoclave assembly is made as small as is practical in order to approach as nearly as possible a linear heating rate. Also, the sample block is designed to occupy substantially the entire volume of the autoclave chamber to minimize convection currents. Pressure seals of conventional design are adapted for pressures of about 1000 atmospheres and higher.

Figure 2:
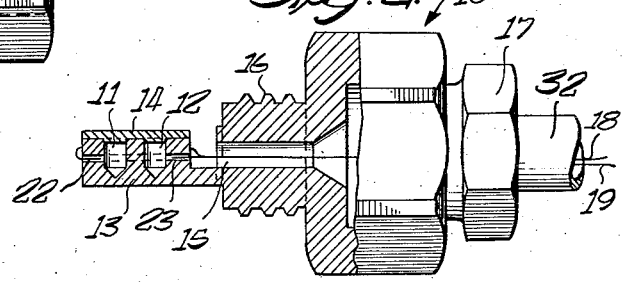
Figure 3:
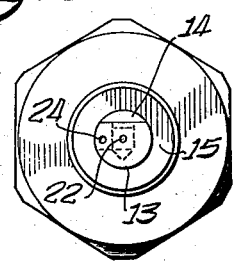
Figure 4:
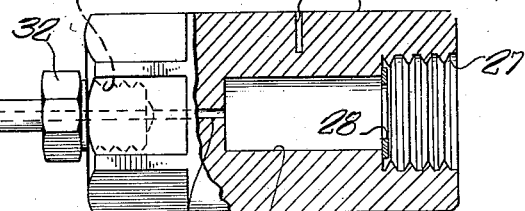

Further details of construction and advantages of the apparatus will be described by reference to a preferred embodiment of my invention which is illustrated in the accompanying drawings and wherein:

Figure 1 is a plan view of the sample block;
Figure 2 is a section taken along the line 2—2 in Figure 1;
Figure 3 is an end taken along the line 3—3 in Figure 1;
Figure 4 is a section through the autoclave which with the sample block of Figures 1 and 3 forms the autoclave assembly; and Figure 5 is a diagrammatic view of the differential thermocouple circuitry.

Referring to the drawing, sample block 10 includes the sample cell 11 and the reference cell 12 within the shank 13. The cells 11 and 12 are enclosed by cover 14. A bore 15 through the externally threaded body 16 of the sample block assembly 10 communicates with the internally threaded recess 17 for connection with pressure lines and seals (not shown) within which the thermocouple leads 18 and 19 pass to the recorder 31.

Figure 5:
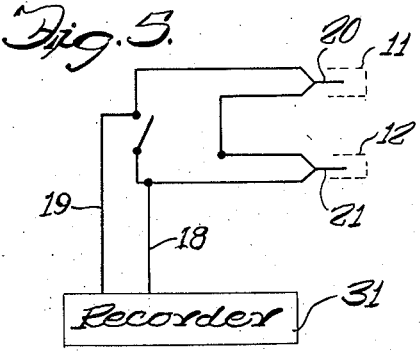

The differential thermocouple assembly shown in Figure 5 includes the sample thermocouple 20 disposed in cell 11 and the reference thermocouple 21 disposed in cell 12. The leads 18 and 19 from the respective cells 11 and 12 pass through channels 22 and 23 in shank 13 and the leads 18 from sample cell 11 double back within channel 24 to the bore 15 in body 16.

The autoclave body 25 includes the cylindrical autoclave chamber 26 having an internally threaded recess 27 at one end which is adapted to be threaded about the body 16 of the sample block 10. Gold or silver ring seal 28 is interposed the end of recess 27 and the abutting face of body 16 to provide a high pressure seal therebetween. When the body 25 is threaded onto the sample block 10, the shank 13 with the sample cell 11, reference cell 12 and cover 13 substantially fill the chamber 26. The outer edges of the cover 14 are beveled as shown in Figure 3 thereby making a snug fit with the walls of chamber 26.

Pressuring fluids are introduced into the chamber 26 by channel 29 in the autoclave body 25. Conventional pressure conduit and seal are applied to the threaded recess 30 which is in communication with the channel 29.

In operation, the sample is loaded within cell 11, the reference material is deposited within cell 12 and cover 14 is placed over them. The thermocouples 20 and 21 are arranged and the leads 18 and 19 are passed through the bore 15 to a suitable recorder 31. The differential thermocouple measuring and recording circuit is shown in Figure 5.

After loading the sample block 10, the autoclave body 25 with its chamber 26 is slipped over the shank 13 and the threads on 16 and 27 are drawn up against seal 28. This is done by maintaining the sample block 10 in a level position and by rotating the autoclave body 25 about the shank 13. The overall dimensions of the autoclave assembly are a length of about 4 inches and a diameter of about 1.5 inches.

The pressure seals at 17 and 30 are then made without changing the position of the autoclave assembly and the level autoclave is inserted within a horizontal muffle furnace and heated to the elevated temperatures desired for the study. The pressures within the autoclave assembly and the atmospheres maintained therein can be controlled and/or varied by conventional means not shown in the drawing.

My apparatus has been used in studying the compounds formed during the setting of cements and concretes and in evaluating changes under high pressures of various atmospheres of liquids and/or gases wherein dehydration phenomena and phase transformation were indicated by the recorded differential thermal data. Also, the thermal stability of hectorite, the lithium-fluorine expanding clay, has been determined under water pressures and in air. The reference sample used was quartz. Other uses for the apparatus will be apparent to those skilled in these arts.

Although I have described my invention with reference to a particular embodiment thereof, it should be understood that this is by way of illustration only and that the invention is not necessarily limited thereto. In any event, it is contemplated that modifications can be made in the apparatus and in the mode of using the apparatus without departing from the spirit and scope of my invention.

What I claim is:

1. An apparatus for obtaining differential thermal data under high pressures of fluids which comprises in combination an autoclave body having an elongated chamber formed therein, a sample block adapted to be threaded into said autoclave chamber, said block having a sample and reference cell for disposal within said chamber, differential thermocouple means associated with said cells, and means for applying high pressure fluids to said autoclave chamber.

2. A high pressure autoclave adapted for obtaining thermal data in the presence of high pressure fluids which comprises in combination a sample block, differential thermocouple means carried by said sample block, a pair of segregated sample and reference cells provided in said sample block, and an autoclave body having an elongated chamber adapted to be threaded about said sample block including said reference and sample cells, and pressure conduits and seals connected to opposite ends of said sample block and said autoclave body.

3. An apparatus for obtaining differential thermal data under high pressures of fluids which comprises in combination an autoclave body having a cylindrical chamber formed therein and extending longitudinally of said body, there being a threaded entrance to said chamber, sample block means including an externally threaded body adapted to engage the threads on said autoclave body, and a longitudinally extending shank means which is substantially cylindrical in cross section and adapted to be inserted into said longitudinal chamber, there being a pair of separate cells within said shank and open at their upper ends, a thermocouple disposed in each of said cells, the said thermocouples comprising a differential thermocouple, and means for maintaining a fluid pressure on said cells within said autoclave.

References Cited in the file of this patent

UNITED STATES PATENTS 2,705,417    Romo et al. _____ Apr. 5, 1955

FOREIGN PATENTS 1,094,868    France _____ May 25, 1955

OTHER REFERENCES

Hendricks and Alexander: "Minerals Present in Soil Colloids," 48, Soil Science, 257–271, 1939.